(12) United States Patent
Chilwal et al.

(10) Patent No.: US 8,255,859 B2
(45) Date of Patent: Aug. 28, 2012

(54) METHOD AND SYSTEM FOR VERIFICATION OF MULTI-VOLTAGE CIRCUIT DESIGN

(75) Inventors: Harsh Chilwal, Bangalore (IN);
Srikanth Jadcherla, Saratoga, CA (US);
Sriram Kotni, Fremont, CA (US);
Prapanna Tiwari, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 403 days.

(21) Appl. No.: 12/467,955

(22) Filed: May 18, 2009

(65) Prior Publication Data

US 2009/0228852 A1   Sep. 10, 2009

Related U.S. Application Data

(62) Division of application No. 11/696,724, filed on Apr. 5, 2007, now Pat. No. 7,546,566.

(51) Int. Cl.
*G06F 17/50* (2006.01)
*G06F 9/455* (2006.01)

(52) U.S. Cl. ........ 716/132; 716/100; 716/103; 716/104; 716/118; 716/120

(58) Field of Classification Search .......... 716/100–107, 716/109–111, 118–120, 132, 133, 127
See application file for complete search history.

(56) References Cited

U.S. PATENT DOCUMENTS

| | | | | |
|---|---|---|---|---|
| 6,779,163 B2 * | 8/2004 | Bednar et al. | | 716/113 |
| 6,792,582 B1 * | 9/2004 | Cohn et al. | | 716/120 |
| 7,448,003 B2 * | 11/2008 | Zhang et al. | | 716/103 |
| 7,530,047 B2 * | 5/2009 | Wang et al. | | 716/109 |
| 7,546,566 B2 * | 6/2009 | Chilwal et al. | | 716/109 |
| 7,551,985 B1 * | 6/2009 | Chen et al. | | 700/297 |
| 7,669,165 B2 * | 2/2010 | Pandey et al. | | 716/109 |
| 7,984,398 B1 * | 7/2011 | Jadcherla | | 716/106 |
| 2002/0124234 A1 * | 9/2002 | Linz | | 716/18 |

* cited by examiner

*Primary Examiner* — Nghia Doan
(74) *Attorney, Agent, or Firm* — Park, Vaughan, Fleming & Dowler LLP; Laxman Sahasrabuddhe

(57) ABSTRACT

Multi-voltage circuit design verification segregates design elements into iso-voltage-rail blocks. Information on cross-over connections between the iso-voltage-rail blocks is obtained. Voltage effects are simulated in the circuit design, and, based on the cross-over information, the simulation results are modified. This yields more accurate results of simulations for multi-voltage circuit designs.

17 Claims, 13 Drawing Sheets

METHOD AND SYSTEM FOR VERIFICATION OF MULTI-VOLTAGE CIRCUIT DESIGN

RELATED APPLICATION

This application is a divisional application of U.S. patent application Ser. No. 11/696,724, entitled "Method and System for Verification of Multi-Voltage Circuit Design," by inventors Harsh Chilwal, Srikanth Jadcherla, Sriram Kotni and Prapanna Tiwari, filed on 5 Apr. 2007.

BACKGROUND OF THE INVENTION

1. Technical Field

The invention relates generally to verification of electronic circuit designs, and particularly to verification of multi-voltage circuit designs.

2. Prior Art

Electronic Design Automation (EDA) is a process which uses computer programs to design, simulate, and test electronic circuits before they are fabricated. Simulating designs with simulation software on emulation systems, and/or using simulation acceleration systems, detects and corrects design flaws before fabrication of the silicon device. Test before fabrication processes save manufacturers millions of dollars in Non-Recoverable Engineering (NRE) costs.

An automated circuit design process includes several steps, beginning with providing a Hardware Description Language (HDL) description (a high level description) of a circuit design. Several HDLs are commonly available, e.g. Verilog and VHDL. The HDL description may also be in the form of a Register Transfer Logic (RTL) code. A computer-implemented process converts the high-level description into a netlist, which is a description of the electronic circuit that specifies what cells compose the circuit and which pins of which cells are to be connected together ("nets"). A netlist does not describe the physical location of the cells on a silicon chip. The netlist creation process is followed by a placement process, which finds a location for each cell on a circuit board or silicon chip. The locations are specified, typically, in two dimensional (i.e., x, y) spatial coordinates on the circuit board or silicon chip. Subsequently, the netlist and the cell location information are used to perform a wire routing process which generates a wire geometry for connecting pins together. This information is converted into a description of a mask for fabrication of the actual silicon chip. The description may be provided in available languages such as GSD2.

After certain stages of the automated circuit designing process, the resulting information needs to be verified. FIG. 1 is a flowchart illustrating the generic method used by automated circuit design tools for verification of circuit designs. Step 102 inputs a Hardware Description Language (HDL) description of the design. The HDL describes the circuit design in blocks and sub-blocks, which may also be referred to as design elements. Each design element may in itself be a semiconductor device, for example a transistor. A design element may also be a combination of two or more semiconductor devices.

Step 104 compiles the HDL description of the circuit design to logically validate the design. A typical compilation process converts the HDL into several design objects. The design objects may correspond to each design element, the voltage connections to the design element, the logical connections between the design elements, and the like. Subsequent to compilation, step 106 performs the simulation process, which applies voltage vectors at the inputs of the circuit design. These voltage vectors result in logic waveforms in the circuit design. The logic waveforms in a digital circuit have certain specific values, for example, 0, 1, X and Z in case of Verilog. The voltage vector values varying with time change the resulting logic waveforms, which are observed and recorded. Step 108 generates the simulation results representing the behavior of the circuit under certain parameters. The behavior is then compared with the expected results from the circuit.

Electronic circuits are becoming increasingly complex and encountering new problems, including that of power management. Today's electronic circuits consume significant amount of power, which is undesirable because of heating problems and limited battery life of electronic devices. Therefore, managing power for optimal use is highly desired.

One way of optimizing power consumption is by designing multi-voltage electronic circuits. In a multi-voltage design, different functional units of the electronic circuit are operated at different voltages at different times. For example, in case of an electronic circuit for a mobile phone, the functional units for audio, processing and camera are different. When the audio unit is being operated, the camera unit may be switched off and the processing unit may be operated at 1.0 V. In another case, when the camera unit is being operated, the audio unit may be switched off and the processing unit may be operated at 1.2 V. A mobile phone circuit design element may have voltage states such as active, standby, sleep, shutdown, etc.

Multi-voltage electronic circuits have complex designs comprising several elements or cells which are characterized by their connections to various power rails carrying different voltages which may change with time.

FIG. 2 is a schematic of an example design element 402 having input 404 and output 406 connections that carry logic waveforms having particular values, for example 0, 1, X or Z in Verilog. Design element 402 is connected to seven voltage rails; a VDD rail 408, a SLPP rail 410, a SLPN rail 412, a VBBP rail 414, a VBBN rail 416, and a VSS rail 418, and VRET rail (not shown in FIG. 2).

VDD rail 408 is a driving rail that provides power to design element 402. SLPP rail 410 and SLPN rail 412 are sleep rails connected to the gates of header transistor 409 and of footer transistor 411 to apply positive, zero, or negative voltage differences between the gate and the source of the transistors and thereby cut off leakage current between rails 408 and 418. VBBP rail 414 and VBBN rail 416 are body bias rails for Positive Metal Oxide Semiconductor (PMOS) transistor 415 and for Negative Metal Oxide Semiconductor (NMOS) transistor 417 respectively, which are applied to the bulk connection and can either be forward or reverse biased to control threshold voltage (Vt).

Other design elements may have connections to fewer or more voltage rails. For example FIG. 4A design elements A, B and C are each connected to only two voltage rails.

The values of voltages on the rails connected to design element 402 determine its voltage state, of which there may be several. An example design element 402 may have five voltage states: active state, shutdown state, standby state, sleep state, and retention state. During the active state, VDD rail 408 operates on an allotted functional voltage value, and design element 402 can perform all its functions. During shutdown state, VDD rail 408 is turned off, but its voltage value is not zero. Standby state is a low power state which expects a quick wakeup. State retention in memory elements of a design element 402 is essential. Typically, in standby state all the clocks are gated, i.e. deactivated by a gating design element such as an AND gate. Standby state may have multiple grades which progressively turn off more circuitry.

Entering and leaving standby state involves gradually turning off/on of clocks, PLLs, and voltages. Sleep state is a variation of shutdown state, and is also called power gating. SLPP 410 and/or SLPN 412 are controlled with a negative Vgs (V gate-source) to cut off design element 402 from VDD 408 and/or GND=VSS 418.

However, complex voltage designs of electronic circuits make verification of the designs extremely difficult. The above mentioned process is insufficient for validation of multi-voltage circuit designs. Existing methods for verification of multi-voltage electronic circuit design suffer from one or more of the following problems. First, logic simulators for the verification of multi-voltage electronic circuits are not voltage aware, i.e. they do not consider voltage as a parameter for simulation, although in reality voltage is a key parameter. Therefore, any design simulation without consideration of voltage is susceptible to lead to faulty designs. Second, the existing methods of verification of multi-voltage circuit designs do not provide the required accuracy. Third, the existing simulation methods are slow and therefore require long time to generate results. There exists, therefore, a need for a simulation method that is voltage aware.

SUMMARY OF THE INVENTION

The invention provides a method and system for verification of a multi-voltage circuit design which is voltage aware in that it considers voltage as a parameter for simulation along with timing and functionality, and which simulates circuit designs accurately and near-silicon. The method for verification of a multi-voltage circuit design is fast.

One embodiment of the invention provides a method for verification of a multi-voltage circuit design having a Hardware Design Language (HDL) description and multi-voltage information. The HDL description defines a plurality of design elements and the connections between them. The multi-voltage information includes voltage rail information for the design elements. The method is executed by first segregating the design elements into several iso-voltage-rail blocks, such that each design element within an iso-voltage-rail block is connected to the same set of voltage rails. Cross-over information on the connections between iso-voltage-rail blocks is generated. Subsequently, the multi-voltage circuit design is modified using the cross-over information. The voltage effects are simulated in the modified multi-voltage circuit design. Simultaneously with simulation, the values of logic signals at the connections are modified based on the generated cross-over information. The simulation results are captured and used to verify the multi-voltage circuit design.

DETAILED DESCRIPTION

The present invention provides a method and a system for simulating and verifying designs of multi-voltage electronic circuits. The method is typically executed on a computer as a stage of an automated circuit design process.

Figure 1:
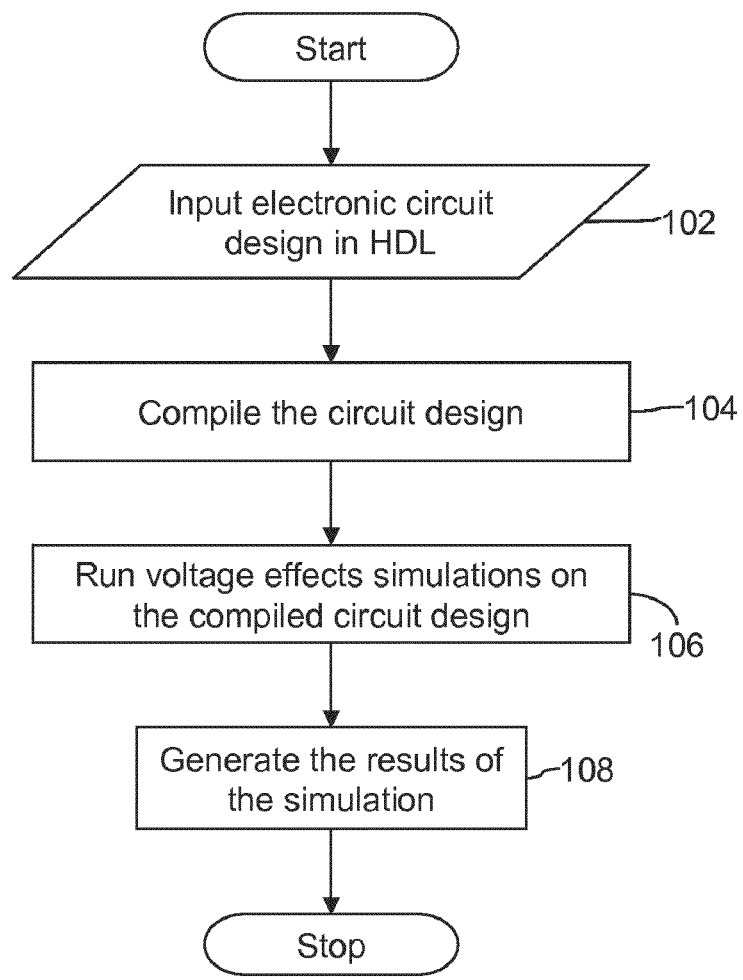
FIG. 1 is a flowchart illustrating the conventional method for verification of electronic circuit designs.
Figure 2:
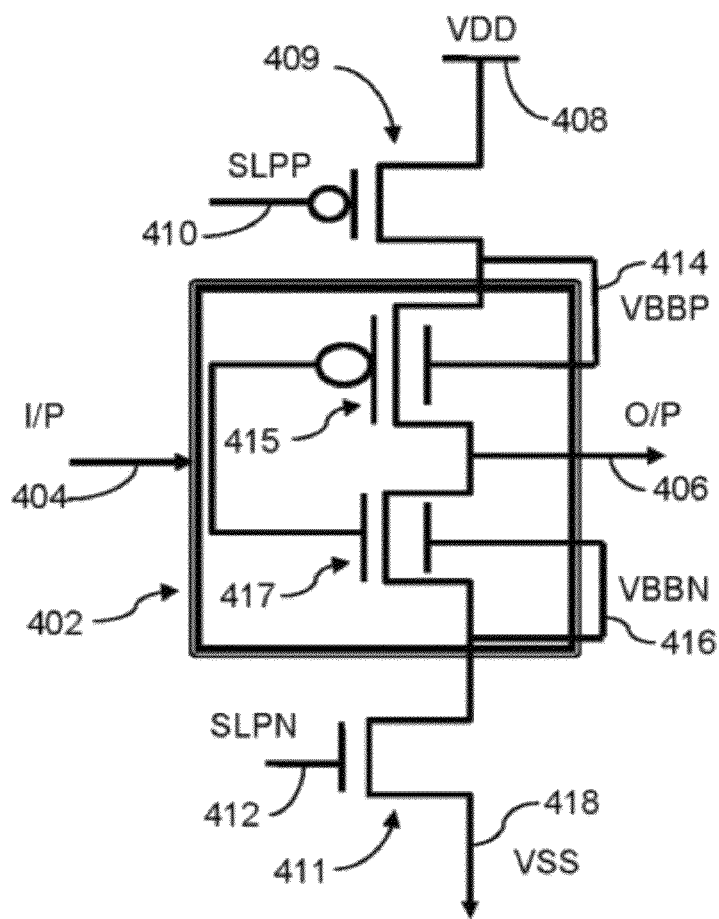
FIG. 2 is a schematic of a conventional multi-voltage design element.
Figure 3:
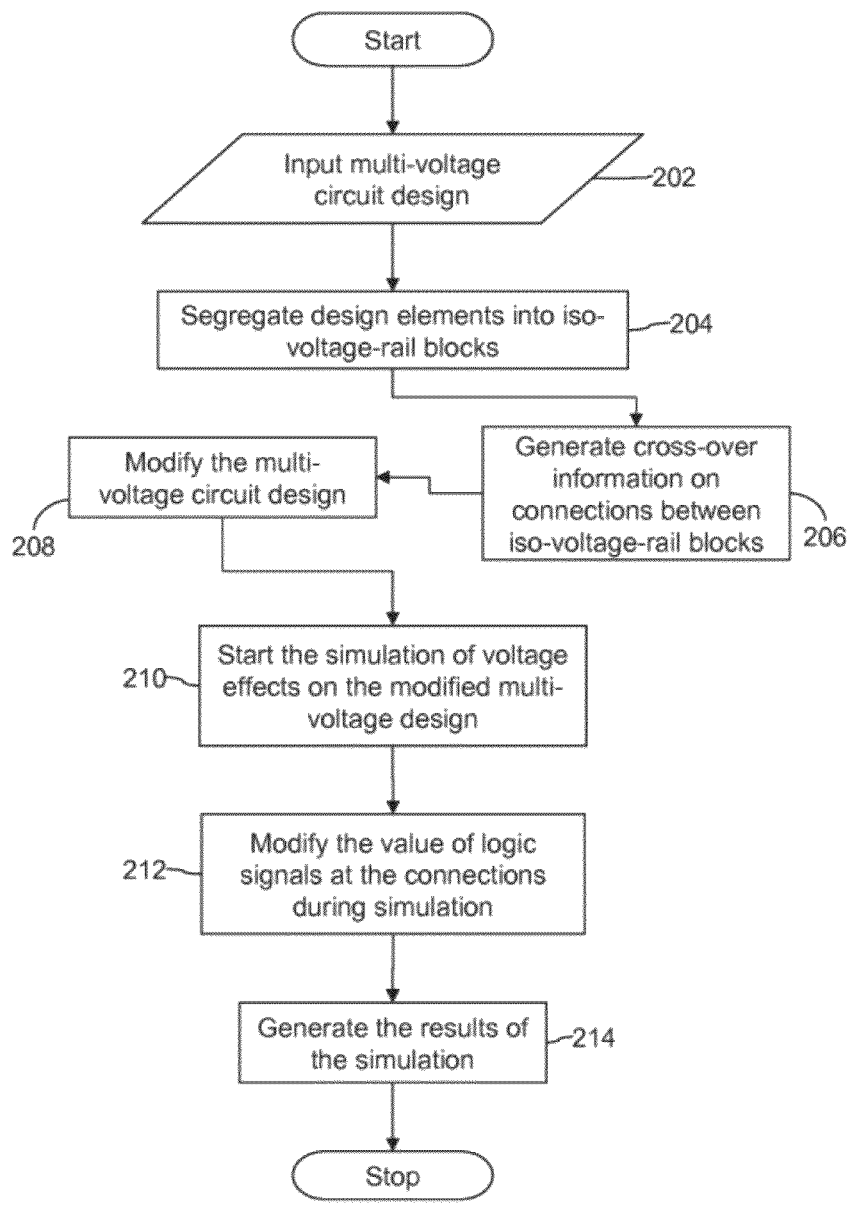
FIG. 3 is a flowchart illustrating a method for verification of a multi-voltage circuit design in accordance with an embodiment of the invention.

FIG. 3 is a flowchart illustrating a method for verifying a multi-voltage circuit design in accordance with the invention. Step 202 takes as input a multi-voltage circuit design including an HDL description of the circuit design and multi-voltage information. The HDL description defines the design elements and their logical connections that form the multi-voltage circuit design.

The multi-voltage information includes various possible voltage states of each design element, and includes information on the voltage values on each voltage rail for every voltage state. The voltages on the rails change with the voltage states of the design elements. For example, a voltage rail may be a driving (VDD) voltage rail or a ground (VSS) voltage rail. In CMOS circuits VDD is the source for PMOS transistors and VSS is the source for NMOS transistors.

Figure 4A:
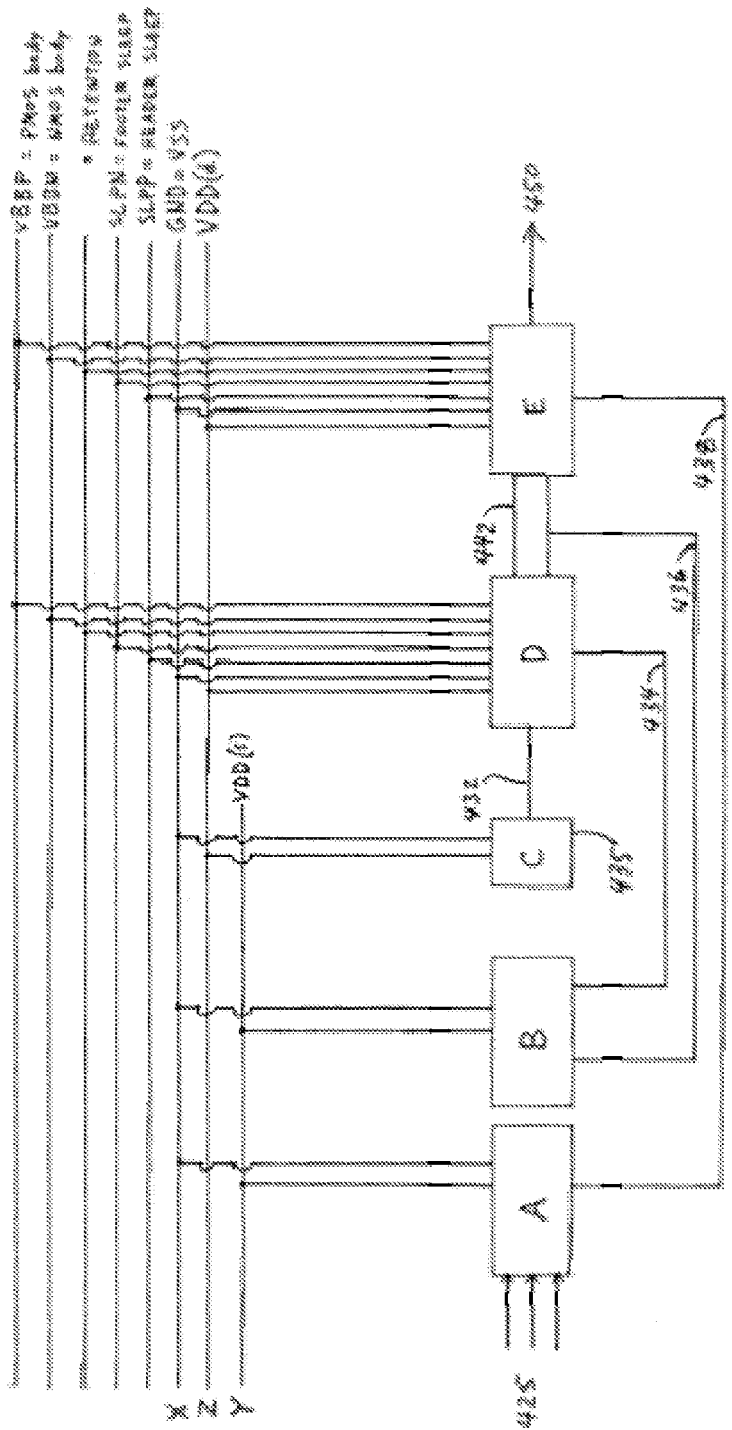
FIG. 4A is a schematic of a circuit including design elements and voltage rails.
Figure 4B:
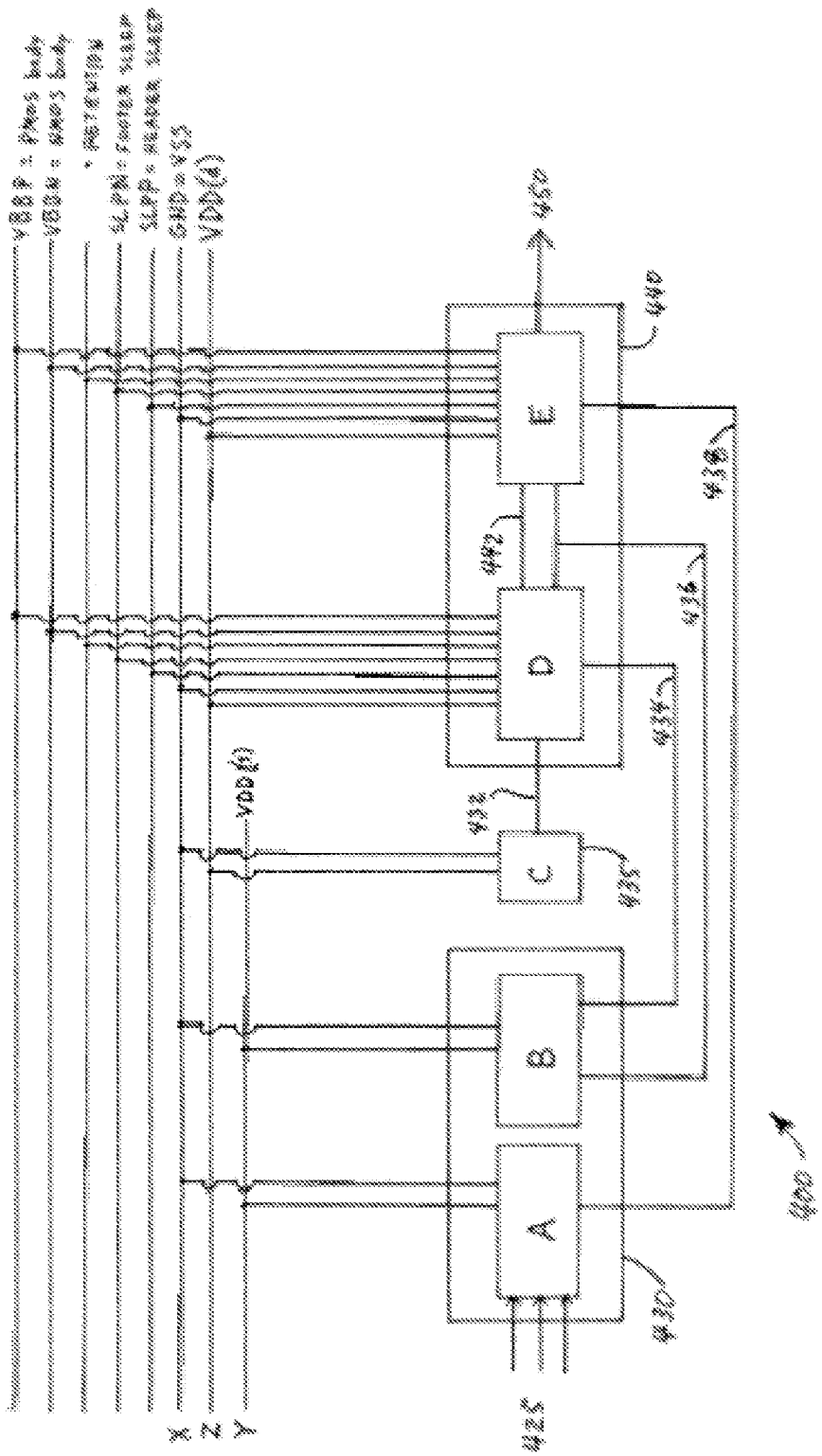
FIG. 4B is a schematic of a circuit including design elements, voltage rails and iso-voltage-rail blocks.

FIG. 4B shows an example circuit 400 having voltage rails including VDD, GND=VSS, Header sleep rail=SLPP, Footer sleep rail=SLPN, Retention rail=RET, NMOS body bias rail=VBBN, and PMOS body bias rail=VBBP. In this circuit each design element A-E is connected to a maximum of seven rails. In other circuits (not shown) design elements may each be connected to between two and nine voltage rails. The number of voltage rails is not a limitation of the invention.

Step 204 segregates the design elements into iso-voltage-rail blocks each of which includes only design elements connected to the same set of voltage rails. As shown in FIG. 4B for example, where design elements A, B and C are all connected to voltage rail X, design elements A and B are also connected to voltage rail Y, and design element C is connected to voltage rail Z, elements A and B belong to the same iso-voltage-rail block 430 but elements C, D and E do not. Elements D and E form iso-voltage-rail block 440.

Step 206 compiles the multi-voltage circuit design to generate cross-over information between iso-voltage-rail blocks. This step identifies all cross-over connections, which are voltage rails (X, Y and Z) and logical connections (432, 434, 436) between design elements in two different iso-voltage-rail blocks (430, 440). The design elements connected by a cross-over connection are called cross-over design elements, for which step 206 generates voltage state information and the associated values of voltages in all voltage rails connected to the cross-over design elements. A design element that drives signals over a cross-over connection is called a driving cross-over design element.

Based on the generated cross-over information, step 208 then modifies the multi-voltage circuit design 400. The HDL description is modified to accommodate certain cross-over information, for example in case of cross-over of VDD, Sleep Header or Sleep Footer voltage rails. Another embodiment appends the RTL code of the multi-voltage circuit design with extra lines of code. For example, continuous assignment statements are added in the case of Verilog, while concurrent assignment statements are added in the case of VHDL.

Step 210 initiates simulation of the modified multi-voltage circuit design, typically on an EDA simulation tool such as VCS™ from Synopsys or Modelsim™ from Mentor. The simulation process applies voltage vectors to the inputs 425 of, and creates voltage waveforms in, the circuit design 400. As the values of voltage vectors vary with time, the resulting simulation outputs vary in response.

Along with step 210 initiating the simulation process, step 212 uses cross-over information generated in step 206 to modify logic signal values being communicated between design elements in different blocks. According to an embodiment of the invention, the modification is achieved by step 212 executing a logic signal modification tool simultaneously with step 210 executing an automated circuit design simulation tool. The logic signal modification tool may be a software plugin to, and share a common database with, the automated circuit design simulation tool. The process of modifying logic signal values is detailed in FIGS. 5A and 5B.

Another embodiment of the invention modifies logic signal values after the simulation process. Once the simulation is partially or fully completed, the simulation outcome is modified according to certain rules. The delay between the completion of the process of simulation and the beginning of the process of modification of logic signal values may be pre-determined or set by a user.

Step 214 generates the simulation results representing the voltage waveforms generated by the circuit upon application of different voltage vectors. These results are compared, possibly manually, with the expected or desired results to identify any faults in the circuit design 400. Other embodiments may employ any existing automated method without deviating from the scope of the invention.

Figure 3A:
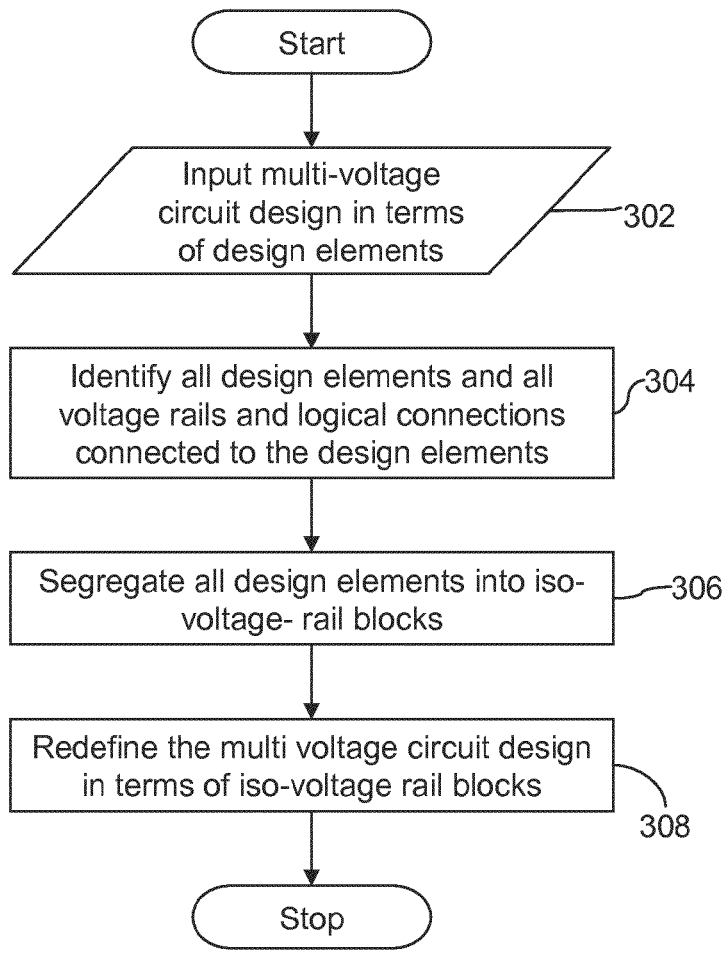
FIG. 3A is a flowchart illustrating a method for simplifying a multi-voltage circuit design.

FIG. 3A is a flowchart illustrating a method for simplifying multi-voltage circuit designs. Step 302 (=step 202) accepts as input a multi-voltage circuit design including an HDL description of the circuit design and multi-voltage information.

From the HDL description of the multi-voltage circuit design, step 304 (=beginning of FIG. 3 step 204) identifies all design elements (A-E) and their logical connections (432, 434, 436, 438, 442). From the multi-voltage information, step 304 identifies information on various possible voltage states of each design element and information on voltage rails connected to each design element.

Step 306 (=ending of FIG. 3 step 204) segregates the design elements into iso-voltage-rail blocks 430, 435, 440 such that each design element within a given iso-voltage-rail block is connected to the same set of voltage rails.

Step 308 (roughly comparable to FIG. 3 step 206) defines the circuit design in terms of iso-voltage-rail blocks rather than individual design elements. The redefined circuit design includes iso-voltage-rail blocks, voltage rails between the iso-voltage-rail blocks, logical connections between the iso-voltage-rail blocks, and logical connections within the iso-voltage-rail blocks. Since all design elements within an iso-voltage-rail block are connected to the same voltage rails and at any given time have the same voltage state, the entire iso-voltage-rail block may be considered as a single entity for a number of purposes. The voltage state of the design elements within an iso-voltage-rail block may also be called the voltage state of the iso-voltage-rail block. This simplifies the circuit design and shortens the time needed for simulation.

Figure 5A:
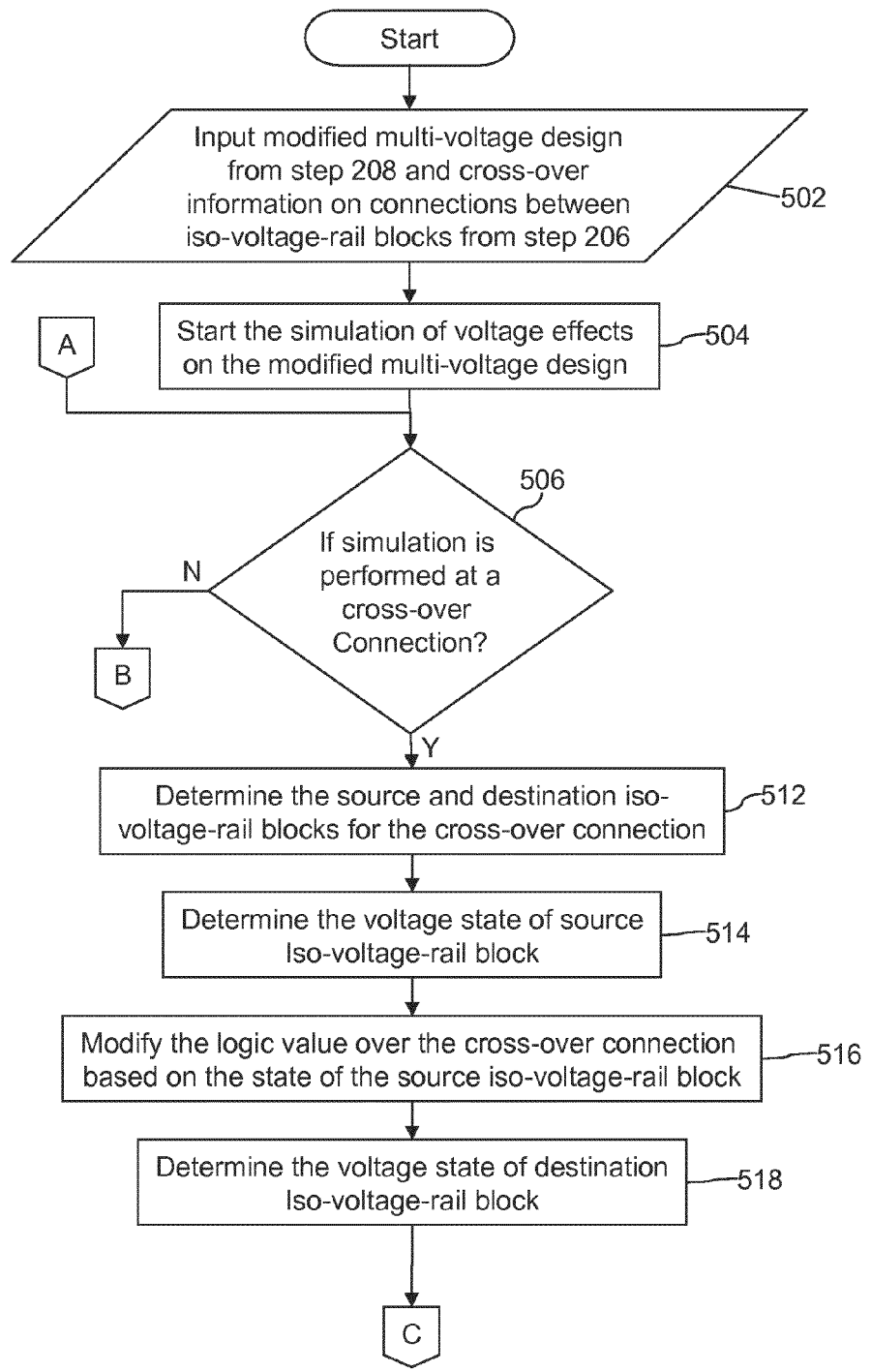
FIGS. 5A and 5B are a flowchart illustrating a method of modification of logic signal values during a simulation in accordance with an embodiment of the invention.
Figure 5B:
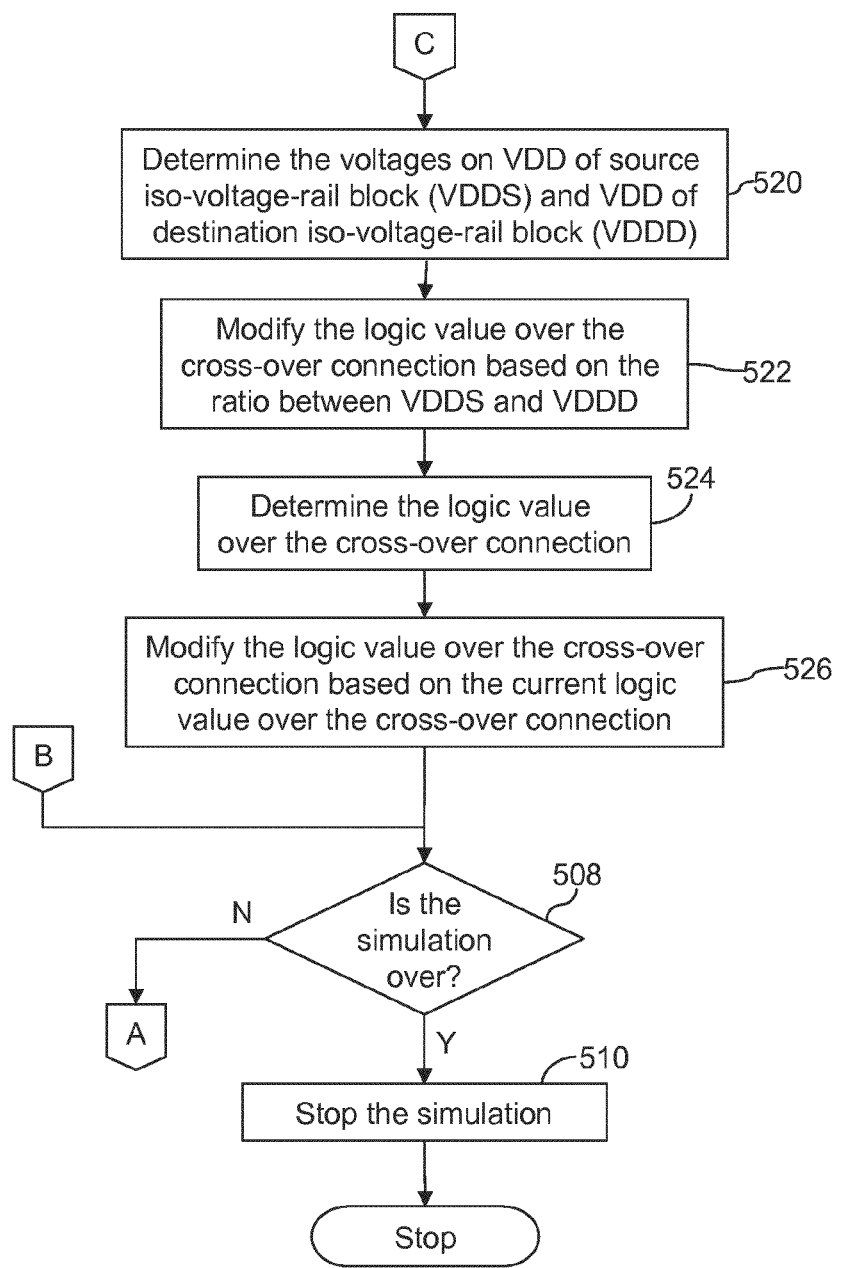

FIGS. 5A and 5B are a flowchart of a method 500 of modifying logic signal values during a simulation process in accordance with an embodiment of the invention. At step 502, modified multi-voltage design and cross-over information on connections between iso-voltage-rail blocks is input. Step 504 starts simulation of voltage effects on the modified multi-voltage design, using a conventional EDA simulation tool.

Step 506 checks whether the connection over which the simulation is being performed is a cross-over connection. Cross-over connections are voltage rails and logical connections between design elements in different iso-voltage-rail blocks. If the connection (e.g., 442) is not a cross-over connection, the method proceeds to step 508, which checks whether the simulation process is complete. If the simulation has completed, the process stops in step 510.

If step 506 finds the connection to be a cross-over connection (e.g. 434), then step 512 identifies the source iso-voltage-rail block (e.g., 430) and the destination iso-voltage-rail block (e.g., 440). The logic signal value on the cross-over connection (e.g., 434) originates in the source iso-voltage-rail block 430 and is received by the destination iso-voltage-rail block 440. Next, step 514 determines the voltage state of the source iso-voltage-rail block 430 as detailed in FIG. 6 steps 604, 608 and 612. Based on the voltage state of the source iso-voltage-rail block 430, step 516 modifies the logic signal value on the cross-over connection 434 before the logic signal value is received at the destination iso-voltage-rail block 440 as detailed in FIG. 6.

Thereafter, step 518 determines the voltage state of the destination iso-voltage-rail block 440, using the same method as for the source iso-voltage-rail block 430. According to an embodiment of the invention, if the voltage state of the destination iso-voltage-rail block 440 is identified to be a shutdown voltage state or a sleep voltage state, the logic signal value is typically not modified.

Subsequent to step 518, step 520 determines the voltages in the VDD voltage rails of the source iso-voltage-rail block (VDDS) and of the destination iso-voltage-rail block (VDDD). Based on the ratio between VDDS and VDDD, step 522 modifies the logic signal value over the cross-over connection 434, as detailed in FIG. 7 steps 704, 706, 708, 710 and 714.

Figure 7:
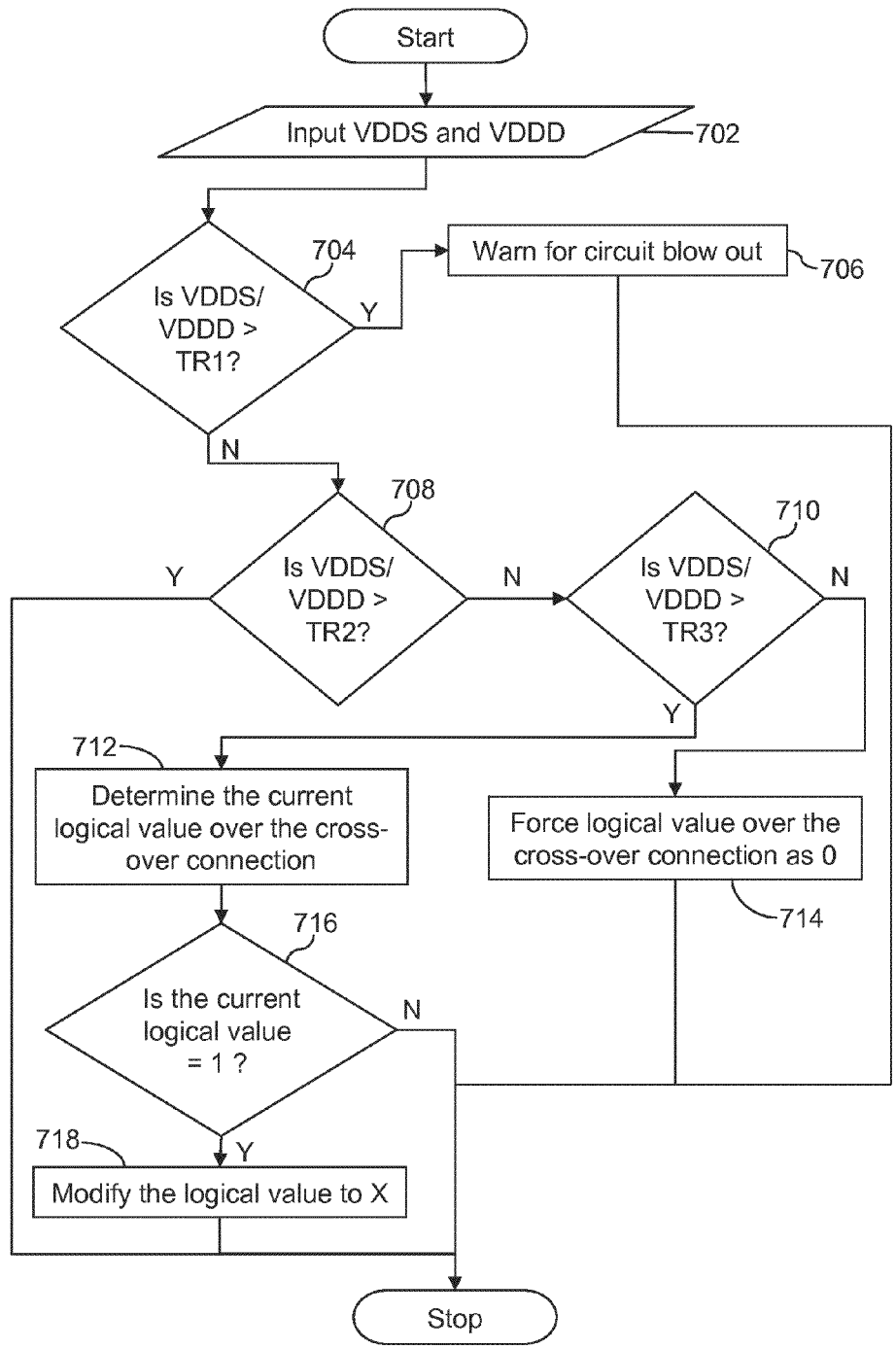
FIG. 7 is a flowchart illustrating a method for modifying the logic signal values based on the ratio of the driving voltage rails in the source and destination blocks and on the current logic signal values.

Step 524 determines the value of the current logic signal on the cross-over connection 434 (FIG. 7 steps 712, 716). Step 526 modifies the logic signal value over the cross-over connection 434 based on the current logic signal value of the source of the cross over signal, the driving rail of the source island, state of the source island, driving rail of the destination iso-voltage-rail block and state of the destination iso-voltage-rail block at the cross-over connection, as in FIG. 7 step 718.

After step 526, step 508 tests whether the process is complete. If not, the process returns to step 506.

Figure 6:
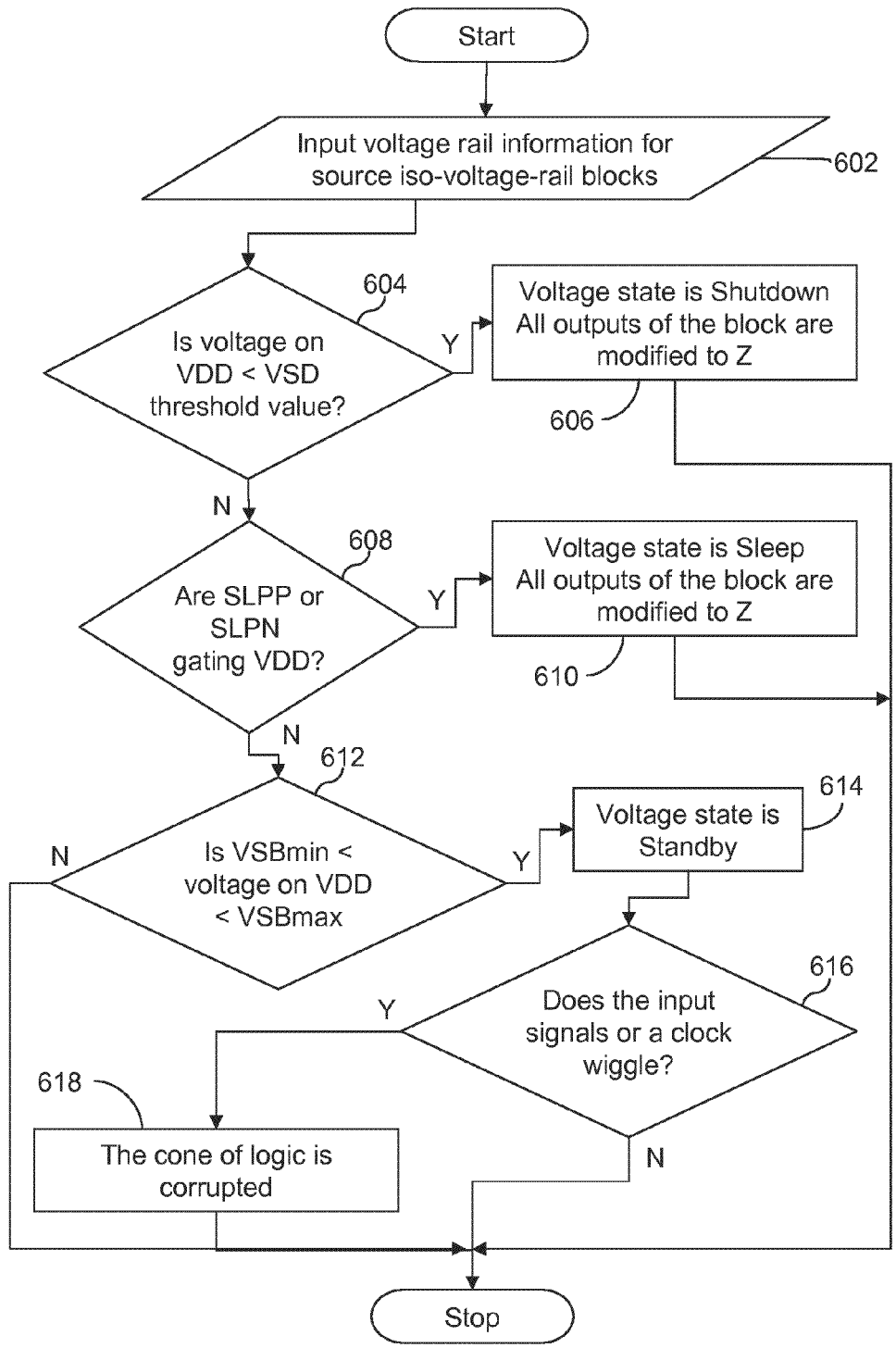
FIG. 6 is a flowchart illustrating a method for identifying the voltage states of source iso-voltage-rail blocks and modifying logic signal values based thereon.

FIG. 6 is a flowchart illustrating a method 600, detailing steps 514 and 516 of FIG. 5A, for identifying the voltage states of source iso-blocks and modifying logic signal values based thereon. Step 602 inputs voltage rail information for the source iso-voltage-rail block, including the voltage values on each voltage rail connected to the source iso-voltage-rail block, the threshold voltage values for each voltage state, and other information.

Step 604 compares the voltage on the VDD(s) voltage rail of the source iso-voltage-rail block against a shutdown threshold voltage value. If the voltage on the VDD(s) voltage rail is less than VSD, then step 606 declares the source iso-voltage-rail block 430 voltage state to be the Shutdown voltage state and modifies the logic signal values over the cross-over connections 434, 436, 438 and any other outputs (not shown) from the source iso-voltage-rail block 430, to Z. The process stops after step 606.

Step 608 tests whether the SLPP voltage rail or the SLPN voltage rail of the source iso-voltage-rail block is gating the VDD voltage rail. If either is gating the VDD voltage rail, then step 610 declares that the source iso-voltage-rail block 430 voltage state to be the Sleep voltage state and modifies the logic signal values over the cross-over connections 434, 436, 438 and any other outputs (not shown) from the source iso-voltage-rail block, to Z. After step 610 the process stops.

Step 612 compares the value of voltage on the VDD voltage rail of the source block against a standby maximum threshold voltage value (VSBmax) and a standby minimum threshold value (VSBmin). If VDD is between VSBmin and VSBmax, then step 614 declares the source iso-voltage-rail block 430 voltage state to be Standby. Step 616 monitors the input signals and the clocks within the source iso-voltage-rail block 430 to see if they wiggle. If so, then in step 618, where the input signal or the clock wiggles, the signals driven directly or indirectly by the iso-voltage-rail block 430 are corrupted by forcing the logic signal value to X on every connected connection. The process stops after step 618.

FIG. 7 is a flowchart illustrating a method 700, detailing steps 522, 524, and 526 of FIG. 5B, for modifying the logic signal values based on the ratio of the driving voltage rails in the source and destination blocks and current logic signal values. At step 702, the values of the voltages in the VDD voltage rails of the source iso-voltage-rail block (VDDS), and of the destination iso-voltage-rail block (VDDD), are input. Step 704 tests whether the ratio of VDDS over VDDD, i.e. VDDS/VDDD, exceeds a threshold ratio value TR1. If so then step 706 issues a "circuit blowout" warning and the process is stopped. Otherwise step 708 tests whether VDDS/VDDD exceeds a threshold ratio value TR2. If so then the process is stopped. Otherwise step 710 tests whether VDDS/VDDD exceeds a threshold ratio value TR3. If so, then step 712 is executed, otherwise step 714 is executed. Step 712 determines the current logic signal value over the cross-over connection 434. Step 712 is followed by step 716 which checks whether the current logic signal value equals 1. If so, then step 718 is executed, otherwise the modification process is stopped. At step 718 the logic signal value over the cross-over connection 434 is modified to X. The process is stopped after execution of step 718. Step 714 modifies the logic signal value to 0, and then the process stops.

Figure 8:
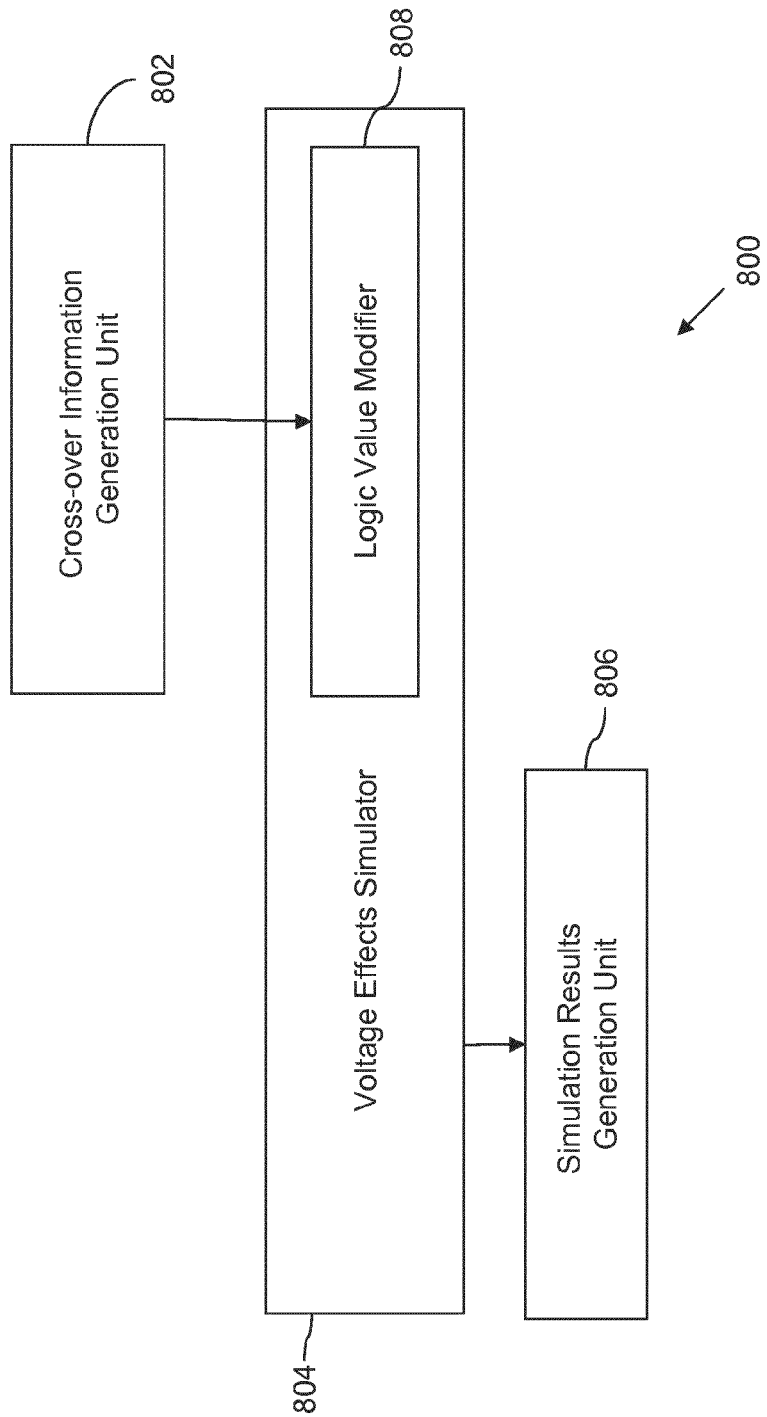
FIG. 8 is a schematic representing a system for verification of a multi-voltage circuit design in accordance with an embodiment of the invention.

FIG. 8 is a schematic representation of a system for verification of a multi-voltage circuit design, in accordance with an embodiment of the invention. Multi-voltage circuit design verification system 800 includes a cross-over information generation unit 802, a voltage effects simulator 804 including a logic value modifier 808, and a simulation results generation unit 806.

Cross-over information generation unit 802 receives a multi-voltage circuit design as input. The multi-voltage circuit design includes an HDL description of the circuit design and multi-voltage information. The HDL description defines several design elements and their logical connections. The multi-voltage information includes information on various possible voltage states of each design element and information on voltage rails connected to each design element. The values of voltages on the voltage rails change with the voltage states of the design elements. The multi-voltage information also includes information on the voltage values on each voltage rail for every voltage state.

Cross-over information generation unit 802 segregates design elements into iso-voltage-rail blocks (430, 440) and identifies all voltage rails (X and Z) and logical connections (432, 434, 436, 438) between design elements in different iso-voltage-rail blocks.

Voltage effects simulator 804 receives the multi-voltage circuit design and simulates voltage effects on the design. Logic value modifier 808 receives cross-over information from cross-over information generation unit 802. After voltage effects simulator 804 simulates a waveform at a cross-over connection, modifier 808 modifies the logic values of the simulated waveforms. The conditions for modification of the logic value are discussed above in conjunction with FIGS. 5A and 5B.

Simulation results generation unit 806 generates the results of the simulation executed by voltage effects simulator 804. According to an embodiment of the invention, the results of the simulation may in the form of assertion logs, which contain any multi-voltage related information, warnings or errors.

Figure 9:
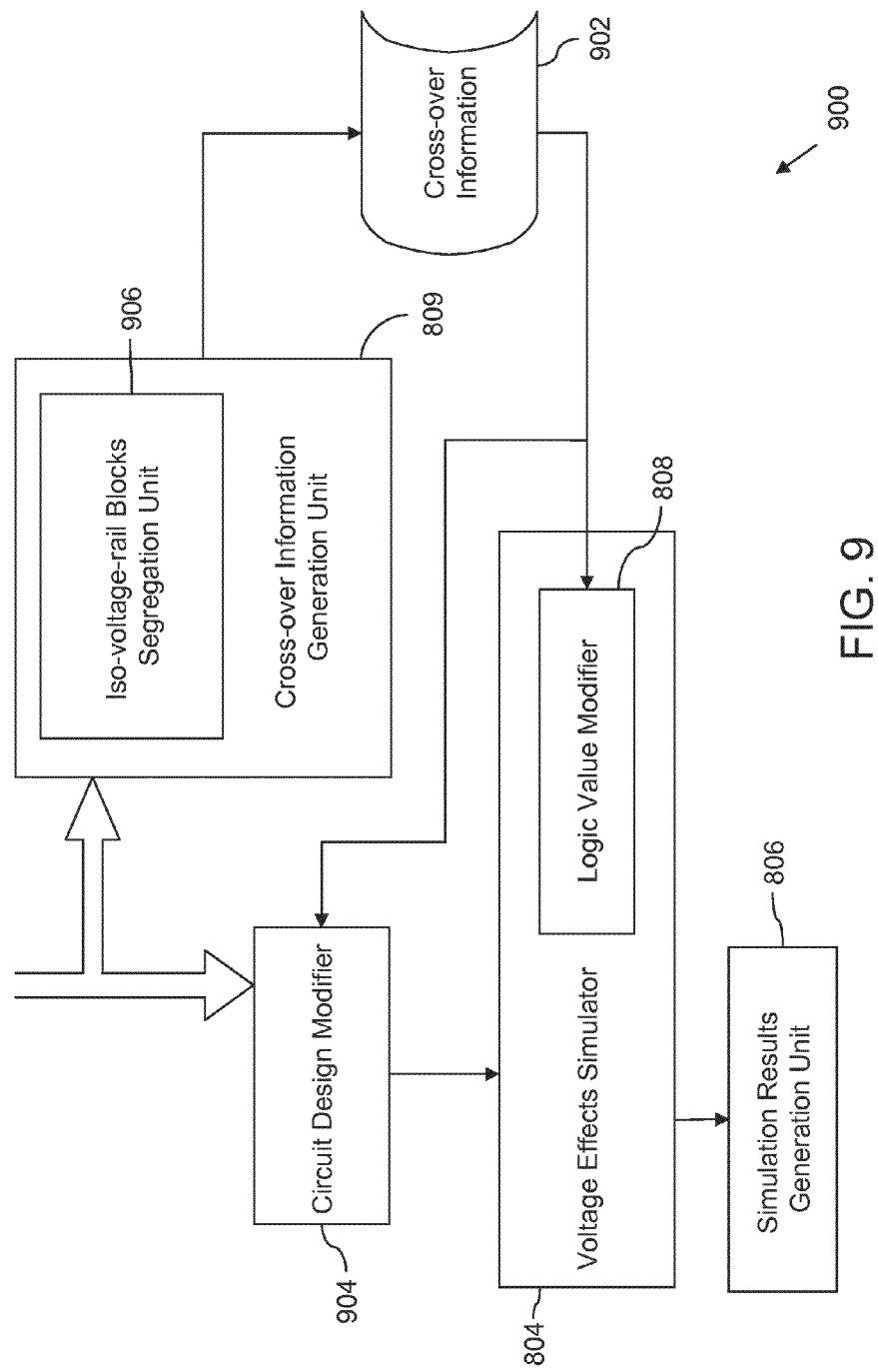
FIG. 9 is a schematic representing a system for verification of a multi-voltage circuit design, in accordance with another embodiment of the invention.

FIG. 9 is a schematic representing a system for verification of a multi-voltage circuit design, in accordance with another embodiment of the invention. Multi-voltage circuit design verification system 900 includes all elements of multi-voltage circuit design verification system 800 and further includes a cross-over information database 902 and a circuit design modifier 904.

In system 900 cross-over information generation unit 809 further includes an iso-voltage-rail blocks segregation unit 906 which segregates design elements into iso-voltage-rail blocks and identifies all voltage rails and logical connections between two design elements that are present in two different iso-voltage-rail blocks.

Cross-over information database 902 receives and stores cross-over information from cross-over information generation unit 809. Cross-over information database 902 is also connected to logic value modifier 808 and circuit design modifier 904. Cross-over information database 902 sends cross-over information to logic value modifier 808 and circuit design modifier 904. Circuit design modifier 904 receives an HDL description of a multi-voltage design and cross-over information which circuit design modifier 904 accommodates by modifying the HDL description. One embodiment of the invention modifies the HDL description only in case of cross-over of VDD, Sleep Header or Sleep Footer voltage rails. Another embodiment of the invention appends the RTL code of the multi-voltage circuit design along with extra lines of code.

Figure 10B:
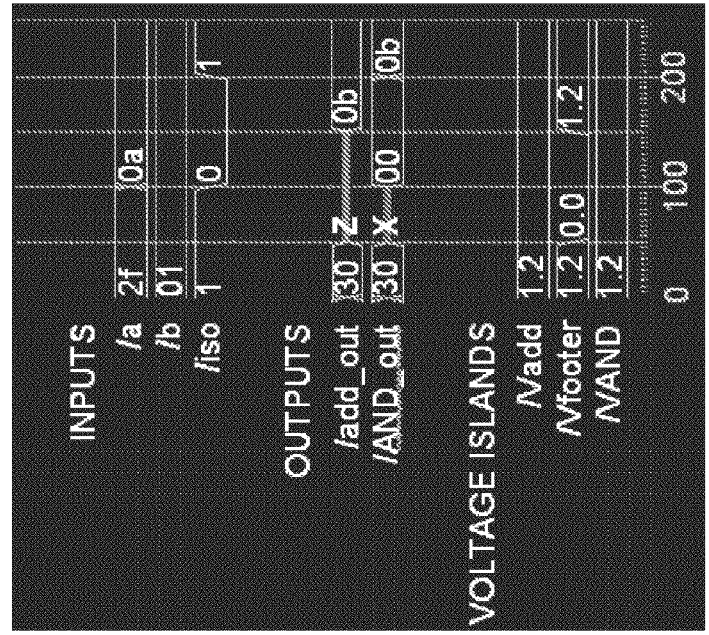
FIGS. 10A and 10B are pictorial representations of an exemplary output of an implemented system according to the invention.
Figure 10A:
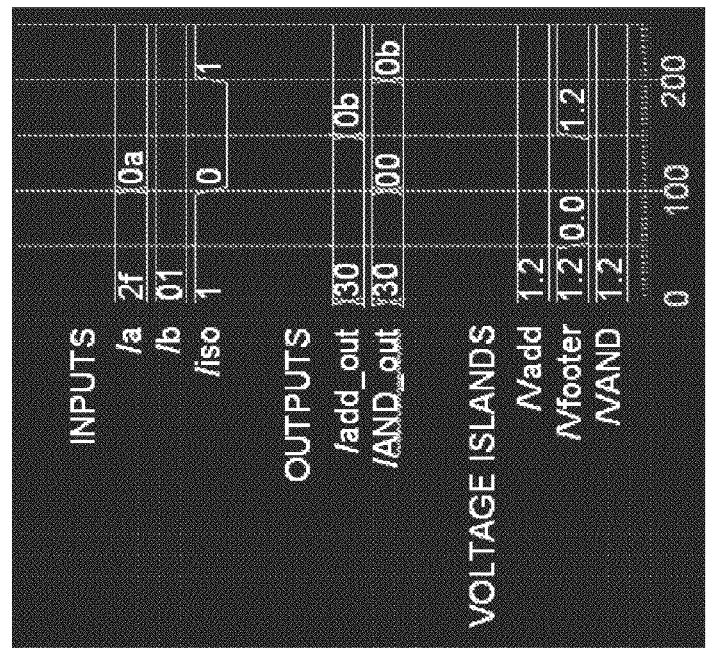

FIGS. 10A and 10B are pictorial representations of an exemplary output of an implemented system. FIG. 10A is the output of a conventional multi-voltage circuit design verification system which does not show any error message or alarm. However, for the same inputs to the disclosed system, the FIG. 10B output shows errors and thereby alarms the user.

The disclosed system alerts the circuit designer to situations that would go unchecked using conventional systems. The invention therefore provides a near-silicon method for verification of multi-voltage circuit designs.

The invention as described may be embodied in the form of a processing machine such as a computer, a programmed microprocessor, an integrated circuit, or other devices or arrangements of devices that are capable of implementing the steps of the method of the current invention. While the preferred embodiments of the invention have been illustrated and described, the invention is not limited to these embodiments. Numerous modifications, changes, variations, substitutions and equivalents will be apparent to those skilled in the art without departing from the spirit and scope of the invention as defined in the claims.

The invention claimed is:

1. A method for modifying a description of a multi-voltage circuit design, the method comprising:
   receiving a description of a multi-voltage circuit design, wherein the multi-voltage circuit design includes a plurality of design elements which are coupled to a plurality of voltage rails;
   segregating, by computer, the plurality of design elements into iso-voltage-rail blocks, wherein design elements in each iso-voltage-rail block are coupled to the same set of voltage rails, and wherein segregating the plurality of design elements into iso-voltage-rail blocks involves:
      identifying a first set of design elements in the description of the multi-voltage circuit design, wherein each design element in the first set of design elements is coupled to a first set of voltage rails; and
      identifying a second set of design elements in the description of the multi-voltage circuit design, wherein each design element in the second set of design elements is coupled to a second set of voltage rails which is different from the first set of voltage rails, and wherein at least one voltage rail in the second set of voltage rails is a non-power-supply rail; and
   creating a modified description of the multi-voltage circuit design which describes the multi-voltage circuit design in terms of iso-voltage-rail blocks.

2. The method of claim 1, wherein creating the modified description of the multi-voltage circuit design involves:
   creating a description of a first iso-voltage-rail block which includes the first set of design elements; and
   creating a description of a second iso-voltage-rail block which includes the second set of design elements.

3. The method of claim 1, wherein segregating the plurality of design elements into iso-voltage-rail blocks involves identifying logical couplings between design elements in different iso-voltage-rail blocks.

4. The method of claim 1, wherein segregating the plurality of design elements into iso-voltage-rail blocks involves identifying logical couplings between design elements in the same iso-voltage-rail block.

5. The method of claim 1, wherein segregating the plurality of design elements into iso-voltage-rail blocks involves identifying voltage rails which cross multiple iso-voltage-rail blocks.

6. The method of claim 1, wherein creating the modified description of the multi-voltage circuit design involves modifying the description of the circuit design to include information of voltage rails that cross multiple iso-voltage-rail blocks.

7. The method of claim 1, wherein creating the modified description of the multi-voltage circuit design involves adding lines of code to the description of the multi-voltage circuit design to describe logical couplings between design elements that cross multiple iso-voltage-rail blocks.

8. A non-transitory computer-readable storage medium storing instructions that when executed by a computer cause the computer to perform a method for modifying a description of a multi-voltage circuit design, the method comprising:
   receiving a description of a multi-voltage circuit design, wherein the multi-voltage circuit design includes a plurality of design elements which are coupled to a plurality of voltage rails;
   segregating the plurality of design elements into iso-voltage-rail blocks, wherein design elements in each iso-voltage-rail block are coupled to the same set of voltage rails, and wherein segregating the plurality of design elements into iso-voltage-rail blocks involves:
      identifying a first set of design elements in the description of the multi-voltage circuit design, wherein each design element in the first set of design elements is coupled to a first set of voltage rails; and
      identifying a second set of design elements in the description of the multi-voltage circuit design, wherein each design element in the second set of design elements is coupled to a second set of voltage rails which is different from the first set of voltage rails, and wherein at least one voltage rail in the second set of voltage rails is a non-power-supply rail; and
   creating a modified description of the multi-voltage circuit design which describes the multi-voltage circuit design in terms of iso-voltage-rail blocks.

9. The non-transitory computer-readable storage medium of claim 8, wherein creating the modified description of the multi-voltage circuit design involves:
   creating a description of a first iso-voltage-rail block which includes the first set of design elements; and
   creating a description of a second iso-voltage-rail block which includes the second set of design elements.

10. The non-transitory computer-readable storage medium of claim 8, wherein segregating the plurality of design elements into iso-voltage-rail blocks involves identifying logical couplings between design elements in different iso-voltage-rail blocks.

11. The non-transitory computer-readable storage medium of claim 8, wherein segregating the plurality of design elements into iso-voltage-rail blocks involves identifying logical couplings between design elements in the same iso-voltage-rail block.

12. The non-transitory computer-readable storage medium of claim 8, wherein segregating the plurality of design elements into iso-voltage-rail blocks involves identifying voltage rails which cross multiple iso-voltage-rail blocks.

13. The non-transitory computer-readable storage medium of claim 8, wherein creating the modified description of the multi-voltage circuit design involves modifying the description of the circuit design to include information of voltage rails that cross multiple iso-voltage-rail blocks.

14. The non-transitory computer-readable storage medium of claim 8, wherein creating the modified description of the multi-voltage circuit design involves adding lines of code to the description of the multi-voltage circuit design to describe logical couplings between design elements that cross multiple iso-voltage-rail blocks.

15. An apparatus for modifying a description of a multi-voltage circuit design, the apparatus comprising:
   a segregating mechanism configured to segregate a plurality of design elements in the description of the multi-voltage circuit design into iso-voltage-rail blocks, wherein design elements in each iso-voltage-rail block are coupled to the same set of voltage rails, and wherein segregating the plurality of design elements into iso-voltage-rail blocks involves:
      identifying a first set of design elements in the description of the multi-voltage circuit design, wherein each design element in the first set of design elements is coupled to a first set of voltage rails; and identifying a second set of design elements in the description of the multi-voltage circuit design, wherein each design element in the second set of design elements is coupled to a second set of voltage rails which is different from the first set of voltage rails, and wherein at least one voltage rail in the second set of voltage rails is a non-power-supply rail; and a cross-over information generating mechanism configured to generate cross-over information which describes logical couplings and voltage rails that cross multiple iso-voltage-rail blocks; and a circuit-design modifying mechanism configured to use the iso-rail blocks and the cross-over information to create a modified description of the multi-voltage circuit design which describes the multi-voltage circuit design in terms of iso-voltage-rail blocks.

16. The apparatus of claim 15, wherein the cross-over information generating mechanism is configured to:
   identify logical couplings between the first set of design elements and the second set of design elements; and
   identify voltage rails that are common to the first set of design elements and the second set of design elements.

17. The apparatus of claim 15, wherein the circuit-design modifying mechanism is configured to:
   create a description of a first iso-voltage-rail block which includes the first set of design elements; and
   create a description of a second iso-voltage-rail block which includes the second set of design elements.

* * * * *